(12) United States Patent
Janson et al.

(10) Patent No.: US 9,568,119 B2
(45) Date of Patent: Feb. 14, 2017

(54) SYSTEM AND METHOD FOR CALIBRATING ELECTROHYDRAULIC VALVE

(71) Applicant: Caterpillar Global Mining America LLC, Houston, PA (US)

(72) Inventors: Brett J. Janson, Hanna City, IL (US); Matthew J. Beschorner, Plainfield, IL (US)

(73) Assignee: Caterpillar Global Mining America LLC, Houston, PA (US)

( * ) Notice: Subject to any disclaimer, the term of this patent is extended or adjusted under 35 U.S.C. 154(b) by 272 days.

(21) Appl. No.: 14/296,510

(22) Filed: Jun. 5, 2014

(65) Prior Publication Data
US 2015/0354724 A1 Dec. 10, 2015

(51) Int. Cl.
G01F 1/42 (2006.01)
F16K 37/00 (2006.01)
G01F 1/40 (2006.01)

(52) U.S. Cl.
CPC .............. F16K 37/0091 (2013.01); G01F 1/40 (2013.01)

(58) Field of Classification Search
USPC ....................................... 73/861.62
See application file for complete search history.

(56) References Cited

U.S. PATENT DOCUMENTS

| | | | |
|---|---|---|---|
| 3,101,031 A * | 8/1963 | Crossley, Jr. .............. | F15B 9/09 137/85 |
| 5,623,093 A * | 4/1997 | Schenkel .............. | E02F 9/2025 73/1.01 |
| 5,704,200 A * | 1/1998 | Chmielewski, Jr. . | A01D 41/141 56/10.2 E |
| 5,813,226 A | 9/1998 | Krone et al. | |
| 6,341,552 B1 | 1/2002 | Potter et al. | |
| 6,357,276 B1 * | 3/2002 | Koehler ................ | F15B 11/006 73/1.01 |
| 6,397,655 B1 | 6/2002 | Stephenson | |
| 6,467,264 B1 | 10/2002 | Stephenson et al. | |
| 7,562,554 B2 | 7/2009 | Yoo et al. | |
| 7,997,117 B2 * | 8/2011 | Zhang ................... | G01F 15/005 73/1.79 |
| 8,234,860 B2 | 8/2012 | Beschorner et al. | |
| 2012/0199778 A1 * | 8/2012 | Huang .................. | F41B 11/723 251/321 |
| 2013/0219877 A1 | 8/2013 | Hughes et al. | |

* cited by examiner

*Primary Examiner* — Clayton E Laballe
*Assistant Examiner* — Warren K Fenwick
(74) *Attorney, Agent, or Firm* — Caterpillar Inc.; James Bennin (57) ABSTRACT

A method of calibrating an electrohydraulic valve is disclosed. The method includes actuating an on-off valve to an open position. A speed of a fixed displacement pump is regulated to establish a desired flow rate at an outlet of the pump. The pump is in fluid communication within a closed loop circuit with the on-off valve and the electrohydraulic valve. A target pressure in the closed loop circuit is determined as a function of the desired flow rate. The method further includes increasing a current to the electrohydraulic valve and monitoring the target pressure in the closed loop circuit. A start of a fluid flow through the electrohydraulic valve is determined based on a drop in the target pressure within the closed loop circuit.

20 Claims, 3 Drawing Sheets

SYSTEM AND METHOD FOR CALIBRATING ELECTROHYDRAULIC VALVE

TECHNICAL FIELD

The present disclosure relates to a system and method for calibrating an electrohydraulic valve.

BACKGROUND

Electrohydraulic valves are generally used in hydraulic systems to regulate a flow of a fluid based on electric signals provided by a controller. Electrohydraulic valves may perform various functions within the hydraulic systems, for example, supplying a pressurized fluid to a hydraulic actuator, drain the fluid to a tank, regulate fluid pressure, and so on.

Such electrohydraulic valves generally involve various design and manufacturing complexities. Various moving components of the electrohydraulic valves may also experience wear due to prolonged use. Therefore, responses of the electrohydraulic valves to electrical signals may be unreliable. Hence, calibration of the electrohydraulic valve may be necessary to ensure that the electrohydraulic valves meet desired performance requirements. Calibration of electrohydraulic valves that are fluidly connected with a bypass valve is known in the art. However, there may be a situation in which the hydraulic system may not include a bypass valve.

U.S. Pat. No. 7,562,554 discloses a method for calibrating an independent metering valve. The method for calibrating the independent metering valve having a valve element movable between a flow blocking position and a flow passing position includes directing pressurized fluid to the valve and increasing a current directed to the valve for controlling a position of the valve element. The method further includes sensing a pressure of the fluid. The method for calibrating the valve also includes determining if a time-derivative of the sensed fluid pressure is greater than a predetermined threshold over a predetermined period of time and determining a cracking point current command directed to the valve. The cracking point current command is directed to the valve when the time-derivative of the sensed fluid pressure is greater than the predetermined threshold.

SUMMARY OF THE DISCLOSURE

In one aspect of the present disclosure, a method of calibrating an electrohydraulic valve is disclosed. The method includes actuating an on-off valve to an open position. The on-off valve is configured to provide a set flow restriction to a fluid flow therethrough in the open position. The fluid flow through the on-off valve has a known pressure at a known flow rate. The method further includes regulating a speed of a fixed displacement pump to establish a desired flow rate at an outlet of the pump. The pump is in fluid communication within a closed loop circuit with the on-off valve and the electrohydraulic valve. The method further includes determining a target pressure in the closed loop circuit as a function of the desired flow rate. The method further includes increasing a current to the electrohydraulic valve and monitoring the target pressure in the closed loop circuit. The method also includes determining a start of a fluid flow through the electrohydraulic valve based on a drop in the target pressure within the closed loop circuit.

In another aspect of the present disclosure, a method of calibrating a first electrohydraulic valve configured to control fluid flow from a pump to a cylinder and a second electrohydraulic valve configured to control fluid flow from the cylinder to a tank is disclosed. The method includes opening an on-off valve in a closed loop circuit that includes the first electrohydraulic valve and the pump. The on-off valve is configured to provide set flow restrictions to fluid flow therethrough in the open position. The fluid flow through the on-off valve has a known pressure at a known flow rate. The method of calibrating the first electrohydraulic valve includes actuating the second electrohydraulic valve to an open position. The method further includes regulating a speed of the pump to establish a desired flow rate at an outlet of the pump. The desired flow rate from the pump results in a target pressure in the closed loop circuit. The method further includes increasing a current to the first electrohydraulic valve, monitoring the target pressure in the closed loop circuit, and determining a start of a fluid flow through the first electrohydraulic valve based on a first drop in the target pressure in the closed loop circuit. The method further includes actuating the first electrohydraulic valve and the second electrohydraulic valve to closed positions while maintaining the on-off valve in the open position. The method also includes actuating the first electrohydraulic valve to an open position. The method further includes increasing a current to the second electrohydraulic valve, monitoring the pressure in the closed loop circuit, and determining a start of a fluid flow through the second electrohydraulic valve based on a second drop in the pressure in the closed loop circuit.

In yet another aspect of the present disclosure, a system for calibrating an electrohydraulic valve is disclosed. The system includes a pump configured to pressurize a fluid. The pump is in fluid communication with the electrohydraulic valve. An on-off valve is disposed in fluid communication with the pump and configured to provide a flow restriction to a fluid flow therethrough in the open position. The fluid flow through the on-off valve has a known pressure at a known flow rate. The system further includes a controller communicably coupled to the electrohydraulic valve, the pump, and the on-off valve. The controller is configured to actuate the on-off valve to an open position and regulate the speed of the pump to establish a desired flow rate at the outlet of the pump. The desired flow rate from the pump results in a target pressure as a result of passage through the on-off valve. The controller is further configured to increase a current to the electrohydraulic valve and monitor the target pressure to determine a start of a fluid flow through the second electrohydraulic valve based on a drop in the target pressure.

Other features and aspects of this disclosure will be apparent from the following description and the accompanying drawings.

DETAILED DESCRIPTION

Figure 1:
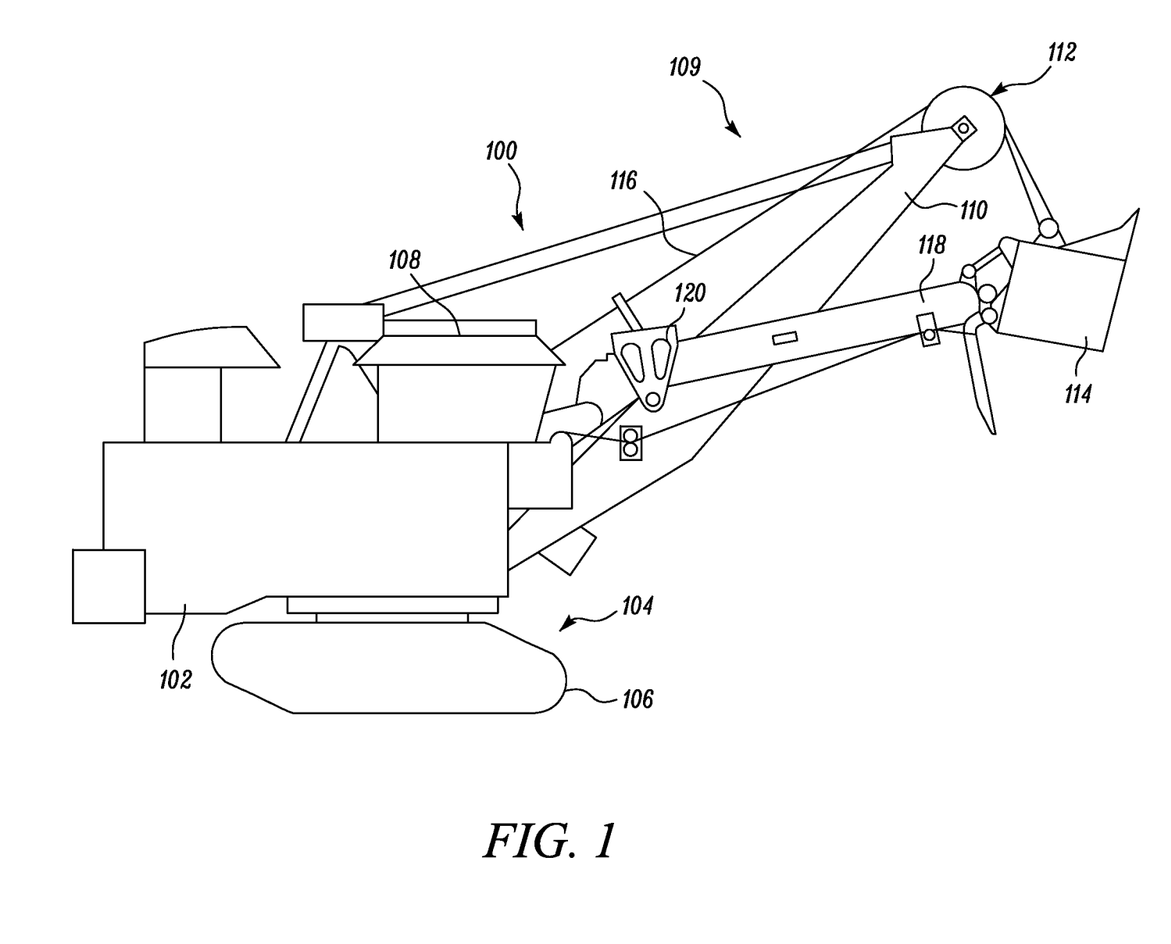
FIG. 1 illustrates a side view of a machine including a hydraulic system, according to an embodiment of the present disclosure.

FIG. 1 illustrates a side view of an exemplary machine 100 according to an embodiment of the present disclosure. The machine 100 may include any machine that may be used for the purpose of construction, mining, quarrying, and so on. The machine 100 may also include earthmoving machines or off-highway vehicles that are provided with a work implement 109 for performing various operations. In the embodiment of FIG. 1, the machine 100 is a rope shovel.

The machine 100 includes a body 102 that is rotatably mounted on a base 104. The base 104 is provided with ground engaging members 106 (only one shown in FIG. 1). In the embodiment of FIG. 1, the ground engaging members 106 are tracks. However, in various other embodiments, the ground engaging members 106 may be wheels, a stationary structure, and the like. The ground engaging members 106 are powered by a prime mover (not shown). The prime mover may be an electric motor. In various embodiments, the electric motor may be driven by an on-board power source (e.g., an engine or a battery) or a remotely located power source via a cable. The machine 100 also includes an operator cab 108 provided with operating members, such as, for example, lever, pedals, buttons, etc. for operating the machine 100 and the work implement 109.

As illustrated in FIG. 1, the work implement 109 includes a boom 110 that is a substantially elongated body having one end coupled to the body 102 and another end coupled with a pulley 112. The boom 110 may be fixed with respect to the body 102. Alternatively, the boom 110 may be pivotal with respect to the body 102.

The work implement 109 may also include a dipper bucket 114 for performing various tasks, such as digging, carrying and unloading a load. The dipper bucket 114 may be suspended using a cable 116 that extends over the pulley 112. A winch (not shown) may be mounted on the body 102 for operatively securing the cable 116. The winch may include a drum (not shown) that winds and unwinds the cable 116 using a motor (not shown). Thus, the dipper bucket 114 is raised and lowered using the cable 116. Further, a dipper arm 118 may be secured to the dipper bucket 114 and supported by an arm mechanism 120 for moving the dipper arm 118 toward and away from the body 102 of the machine 100. The arm mechanism 120 may include an actuator 206 (shown in FIG. 2) for moving the dipper arm 118. In an embodiment, the actuator 206 may be controlled by a hydraulic system 200 (shown in FIG. 2). Hydraulic system 200 may also be associated with various other components of the machine 100, for example, the ground engaging members 106, the dipper bucket 114 etc. Various details of the hydraulic system 200 will be described hereinafter with reference to FIG. 2.

Figure 2:
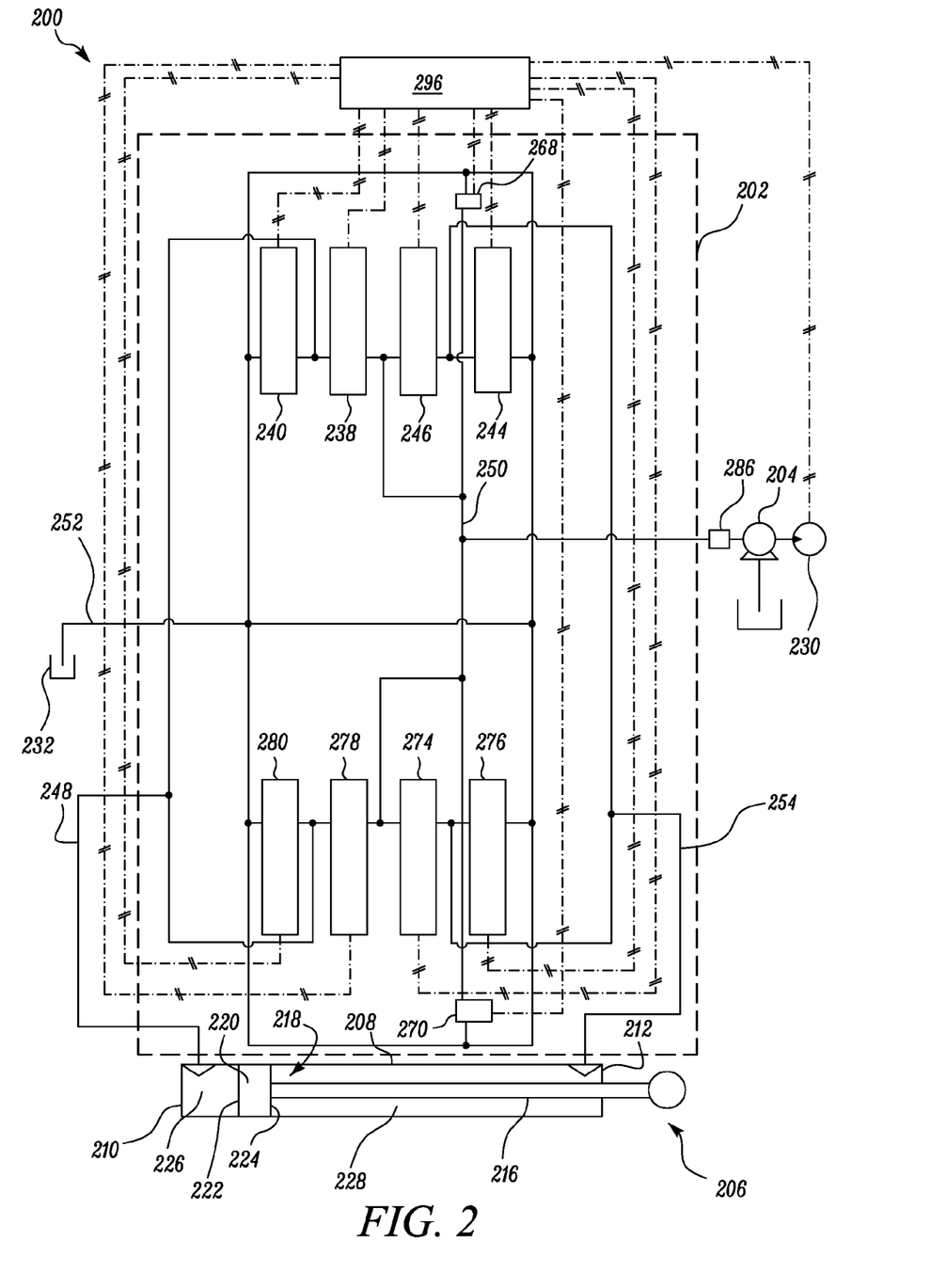
FIG. 2 is a block diagram illustrating the hydraulic system, according to an embodiment of the present disclosure.

FIG. 2 shows a block diagram illustrating the hydraulic system 200, according to an embodiment of the present disclosure. The hydraulic system 200 includes a hydraulic circuit 202 that is fluidly communicated with a pump 204 and the actuator 206. In the embodiment of FIG. 2, the actuator 206 is a hydraulic cylinder. The hydraulic cylinder may be a single acting cylinder or double acting cylinder. Alternatively, the actuator 206 may be a hydraulic motor or any output device that may be hydraulically driven. In an embodiment, the actuator 206 may be operatively coupled with the dipper aim 118 (shown in FIG. 1) for moving the dipper aim 118 towards and away from the body 102 of the machine 100. The machine 100 may include one or more actuators 206 in association with various other components of the machine 100, for example, the ground engaging members 106, the dipper bucket 114 etc.

The actuator 206 includes a tube 208 having a first end 210 and a second end 212. The second end 212 is provided with a through-hole which is adapted to receive a rod 216 of a piston assembly 218. The piston assembly 218 is slidably disposed within the tube 208 in order to be movable between the first end 210 and the second end 212 of the tube 208. As shown in FIG. 2, the piston assembly 218 further includes a piston 220 that defines a first surface 222 and a second surface 224. One end of the rod 216 of the piston assembly 218 is connected with the second surface 224 of the piston 220. In an embodiment, the actuator 206 may be disposed in the machine 100 by coupling the other end of the rod 216 and the tube 208 with two relatively moving components of the machine 100. The piston 220 divides the tube 208 into two chambers, namely, a first chamber 226 and a second chamber 228. The first chamber 226 is defined between the first end 210 of the tube 208 and the first surface 222 of the piston 220. The second chamber 228 is defined between the second end 212 of the tube 208 and the second surface 224 of the piston 220.

Further, in an embodiment, the pump 204 is a fixed displacement pump that supplies a pressurized fluid to the actuator 206 through the hydraulic circuit 202. Alternatively, the pump 204 may include, but is not limited to, a variable displacement pump, dynamic pump, and so on. The pump 204 may be operatively coupled with a motor 230. The motor 230 may regulate speed of the pump 204 to vary displacement of the fluid, and hence pressurize a fluid supplied from the pump 204. The pressure of the fluid flow from the pump 204 may be monitored at any point of the hydraulic circuit 202. The hydraulic system 200 may further include a tank 232 that is in fluid communication with the actuator 206 through the hydraulic circuit 202. The tank 232 may be a fluid reservoir that is fluidly configured in conjunction with the hydraulic circuit 202 to drain the fluid from the actuator 206. The tank 232 may also be fluidly configured to receive pressurized fluid drained from other hydraulic components associated with the hydraulic circuit 202.

In one embodiment of the present disclosure, the hydraulic circuit 202 includes an electrohydraulic valve or a first electrohydraulic valve 238 and an additional or second electrohydraulic valve 240. In the embodiment of FIG. 2, the first electrohydraulic valve 238 may be a Pump-to-Cylinder (PC) valve that is fluidly communicated between the pump 204 and the first chamber 226 of the actuator 206. The second electrohydraulic valve 240 is a Cylinder-to-Tank (CT) valve 240 fluidly communicated between the first chamber 226 of the actuator 206 and the tank 232. The first electrohydraulic valve 238 may be fluidly communicated with a main pressure line 250. The main pressure line 250 is further fluidly communicated with the pump 204 for supplying the pressurized fluid to the first electrohydraulic valve 238. Further, the first electrohydraulic valve 238 and the first chamber 226 of the actuator 206 are fluidly connected via a head end fluid line 248. The second electrohydraulic valve 240 and the first chamber 226 of the actuator 206 are also fluidly connected via the head end fluid line 248. The head end fluid line 248 may be in fluid communication with the first chamber 226 of the actuator 206 to either supply the pressurized fluid to the first chamber 226 from the first electrohydraulic valve 238 or drain the fluid from the first chamber 226 to the tank 232 via the second electrohydraulic valve 240. The second electrohydraulic valve 240 may be fluidly communicated with a main drain line 252. The main drain line 252 is further fluidly communicated with the tank 232 for draining the fluid from the first chamber 226 of the actuator 206 through the second electrohydraulic valve 240. Further, a rod end fluid line 254 may be in fluid communication with the second chamber 228 of the actuator 206 to either supply the pressurized fluid to the second chamber 228 or drain the fluid from the second chamber 228 to the tank 232.

Each of the first and second electrohydraulic valves 238, 240 may be regulated by electric signals from a controller 296. In an embodiment, each of the first and the second electrohydraulic valves 238, 240 may be pilot operated valves having a pilot valve (not shown) that is fluidly integrated with a main valve (not shown). The pilot valve may be an electrically actuated solenoid valve. In an example, the pilot valve may be a three-port two-way valve, in which one of the three ports acts as an input port and either of other two ports acts as an output port. The input port may be connected to a pressurized fluid source via a pilot actuating line. One of the output ports may be connected to the tank 232 via a pilot drain line (not shown). The other output port may be connected to the main valve. The pilot valve may include an electric actuator (not shown) that is electrically communicated with the controller 296. The electric actuator may be a solenoid. The pilot valve may also include a valve element (e.g., a spool) that moves between an actuating position and a non-actuating position. The electric actuator is electrically activated to displace the valve element to the actuating position. The valve element may be normally biased to the non-actuating position unless displaced by the electric actuator. In the non-actuating position, the valve element is positioned such that the input port is connected to the pilot drain line. The pilot valve is electrically actuated through the electric actuator so that the valve element of the pilot valve displaces to the actuating position to fluidly communicate the main valve with the pilot actuating line. In case the main valve is part of the first electrohydraulic valve 238, the pressurized fluid in the pilot actuating line hydraulically actuates the main valve to control flow of the pressurized fluid from the pump 204 to the actuator 206. If the main valve is part of the second electrohydraulic valve 240, then the main valve regulates a flow of fluid from the actuator 206 to the tank 232.

Further, in an example, the main valve may be a two-port two-way valve. In the two ports, one port may be an input port and another port may be an output port. If the main valve is part of the first electrohydraulic valve 238, then the input port may be fluidly coupled with the main pressure line 250 and the output port may be fluidly coupled with the head end fluid line 248. If the main valve is part of the second electrohydraulic valve 240, then the input port is fluidly coupled with the head end fluid line 248 and the output port is fluidly coupled with the main drain line 252. The main valve further includes a valve element (e.g., a spool) that moves between an open position and a closed position. The valve element may be displaced to varying degrees from the closed position to regulate the flow of fluid therethrough. Thus, the open position may correspond to a maximum displacement of the valve element from the closed position. The valve element is moved to the open position based on electric actuation of the pilot valve. Further, the valve element in the main valve is maintained at the closed position when the pilot valve is not actuated. The various details of the first and second electrohydraulic valves 238, 240, as described above, are purely exemplary in nature, and the first and second electrohydraulic valves 238, 240 may be of any alternative configuration within the scope of the present disclosure. For example, the solenoid may be integrated with the main valve to directly actuate it.

The hydraulic circuit 202 may further include an on-off valve 268. The on-off valve 268 is disposed in fluid communication with the main pressure line 250 and the main drain line 252. The main pressure line 250 fluidly communicates the pump 204 and the on-off valve 268, and the main drain line 252 fluidly communicates the on-off valve 268 and the tank 232. In an example, the on-off valve 268 may be a two-port two-way valve and may include a valve element that is movable between either a fully closed position or a fully open position. The on-off valve 268 may be used to warm up the fluid that flows through a fixed restriction. The on-off valve may also be used for stem calibrations or to safely reduce any trapped pressures in a pump core.

Further, the on-off valve 268 includes one input port that is fluidly coupled with the main pressure line 250 and one output port that is fluidly coupled with the main drain line 252. In an embodiment, the on-off valve 268 is a normally closed valve, in which a fluid flow is prevented therethrough. The on-off valve 268 may be kept in an open position, for example, during start of the machine 100, so that the pressurized fluid from the pump 204 may be allowed to circulate through the main pressure line 250 and the main drain line 252 without passing through the first electrohydraulic valve 238. In an embodiment, the on-off valve 268 may be configured with the main pressure line 250 and the main drain line 252 to provide a set flow restriction to a fluid flow therethrough so as to warm the fluid. The on-off valve 268 is then deenergized to the closed position so that pressure of the fluid flow in the hydraulic circuit 202 may be increased to make it available for the first electrohydraulic valve 238. In another embodiment, an additional on-off valve 270 may be disposed in the hydraulic circuit 202 parallel to the first on-off valve 268. The additional on-off valve 270 may be in fluid communication with the pump 204 via the main pressure line 250 and in fluid communication with the tank 232 via the main drain line 252. The working of the additional on-off valve 270 may be similar to the working of the on-off valve 268.

As shown in FIG. 2, the hydraulic circuit 202 includes a second PC valve 246 that may be in fluid communication between the pump 204 and the second chamber 228 of the actuator 206. The second PC valve 246 may be in fluid communication with the main pressure line 250 and the rod end fluid line 254 to supply the pressurized fluid from the pump 204 to the second chamber 228 of actuator 206. The hydraulic circuit 202 may further include a second CT valve 244 that is fluidly disposed between the second chamber 228 of the actuator 206 and the tank 232. The second CT valve 244 may be further fluidly communicated with the main drain line 252 and the rod end fluid line 254 to drain the fluid from the second chamber 228 of the actuator 206 to the tank 232.

The hydraulic circuit 202 also includes a third PC valve 274 and a fourth PC valve 278 for supplementing the flow of the pressurized fluid through the main pressure line 250 in association with the second PC valve 246 and the first PC valve (the first electrohydraulic valve 238), respectively. The third PC valve 274 is fluidly connected between the pump 204 and the second chamber 228 of the actuator 206. Further, the fourth PC valve 278 is fluidly connected between the pump 204 and the first chamber 226 of the actuator 206. The hydraulic circuit 202 may further include a third CT valve 276 and a fourth CT valve 280 for supplementing the flow of the fluid through the main drain line 252 in association with the second CT valve 244 and the first CT valve (the second electrohydraulic valve 240), respectively. The third CT valve 276 and the fourth CT valve 280 are fluidly configured between the second chamber 228 and the first chamber 226, respectively, of the actuator 206 and the tank 232. The PC valves 246, 274, 278 and the CT valves 244, 276, 280 may be of the same configuration as the first and second electrohydraulic valves 238, 240.

In the normal operation of the hydraulic system 200, for extending the length of the actuator 206, the pressurized fluid from the pump 204 may be supplied to the first chamber 226 of the actuator 206 via the first PC valve 238 and the fourth PC valve 278. At the same time, the fluid from the second chamber 228 of the actuator 206 may be drained to the tank 232 via the second CT valve 244 and the third CT valve 276. For retracting the length of the actuator 206, the pressurized fluid from the pump 204 may be supplied to the second chamber 228 of the actuator 206 via the second PC valve 246 and the third PC valve 274. At the same time, the fluid from the first chamber 226 of the actuator 206 may be drained to the tank 232 via the first CT valve 240 and the fourth CT valve 280.

The hydraulic circuit 202 may further include a main pressure sensor 286 disposed on the main pressure line 250 that is in fluid communication with the pump 204. The main pressure sensor 286 is configured to monitor a pressure of the fluid supplied by the pump 204. The main pressure sensor 286 may be communicably coupled to a pressure indicator (not shown). The pressure indicator may be used as an interface between an operator and the hydraulic system 200 to record a pressure of the fluid supplied by the pump 204

In various embodiments, the hydraulic circuit 202 may further include other components such as, for example, one or more check valves, temperature sensors and pressure regulator valves. The hydraulic circuit 202 may also include additional pressure sensors that may be disposed at any point of the main pressure line 250 and/or the main drain line 252 to sense pressure of the fluid at that particular point in the hydraulic circuit 202.

Further, the controller 296 is electrically coupled with the various components of the hydraulic system 200 including the electrohydraulic valves 238, 240, 244, 246, 274, 276, 278, 280, pressure sensor 286 and the motor 230. The controller 296 may include a single microprocessor or multiple microprocessors configured with other associated components of the controller 296 to control various functions of the hydraulic system 200. The controller 296 may also be connected to an operator interface that may include various control members such as, for example, control buttons, control levers, joysticks, and control pedals, to allow the operator to give desired input to the controller 296.

The pump 204 of the hydraulic system 200 is operatively coupled with the motor 230 to receive a driving power from the motor 230. An operator input associated with the motor 230 is provided to the controller 296 through the operator interface for actuating the motor 230. Upon actuation of the motor 230, the pump 204 starts pressurizing a fluid from a fluid reservoir 298. In one embodiment of this disclosure, the pump 204 may be a fixed displacement pump, in which the displacement, or flow through the pump 204 per rotation of the pump 204, cannot be adjusted. With a fixed displacement pump, the flow rate is changed by changing the speed of rotation of the pump 204. The electrohydraulic valves 238, 240, 244, 246, 274, 276, 278, 280 of the hydraulic circuit 202 may comprise an independent metering valve (IMV) used to control operation of one or more actuators such as actuator 206, which perform work on the machine 100. The electrohydraulic valves 238, 240, 244, 246, 274, 276, 278, 280 may periodically require calibration in order to know a precise "cracking" current at which each valve will open against a set target pressure to allow flow through each valve. Calibration of the valves in accordance with various aspects of the present disclosure may require adjustments to the fluid pressure in the fluid lines connected to the valves to arrive at a desired target pressure. In a hydraulic circuit such as hydraulic circuit 202 of FIG. 2, it may be desired to maintain the target pressure at a valve that is to be calibrated by adjusting the speed of rotation of the pump 204 to change the output flow rate for the pump 204. The rate of displacement of the pump 204 may be varied by varying the speed of the motor 230. In a closed loop hydraulic circuit such as the hydraulic circuit including pump 204, on-off valve 268, 270 and any one or more of the electrohydraulic valves 238, 240, 244, 246, 274, 276, 278, 280, the output flow rate of the pump 204 may correspond to a known pressure as a result of flowing through on-off valve 268, 270. The on-off valves 268, 270 typically activate to either a fully opened position or a fully closed position. In a fully opened position the on-off valves 268, 270 have a known restriction to flow, and therefore result in a known pressure at a known flow. Therefore, the desired target pressure for calibration of the valves may be achieved in the closed loop hydraulic circuit by varying the speed of the motor 230 to regulate the flow rate of the fluid from the pump 204.

As shown in FIG. 2, the controller 296 may be configured to electronically communicate with each of the electrohydraulic valves 238, 240, 244, 246, 274, 276, 278, 280. In certain embodiments, an electric actuator of a respective pilot valve for each electrohydraulic valve may be electrically actuated by the controller 296. The controller 296 may be further communicably coupled with an electric actuator of the on-off valve 268. An operator input associated with actuation of the on-off valve 268 may also be communicated from the operator interface of the controller 296. The controller 296, upon receipt of the operator input, actuates the valve element of the on-off valve 268 to the fully open position. Thus, the on-off valve 268 establishes a fluid communication between the pump 204 and the tank 232. The controller 296 may receive operator inputs via the operator interface in order to execute a calibration process of each of the electrohydraulic valves 238, 240, 244, 246, 274, 276, 278, 280. In an alternative embodiment, the controller 296 may be pre-programmed to automatically calibrate each of the electrohydraulic valves 238, 240, 244, 246, 274, 276, 278, 280.

Figure 3:
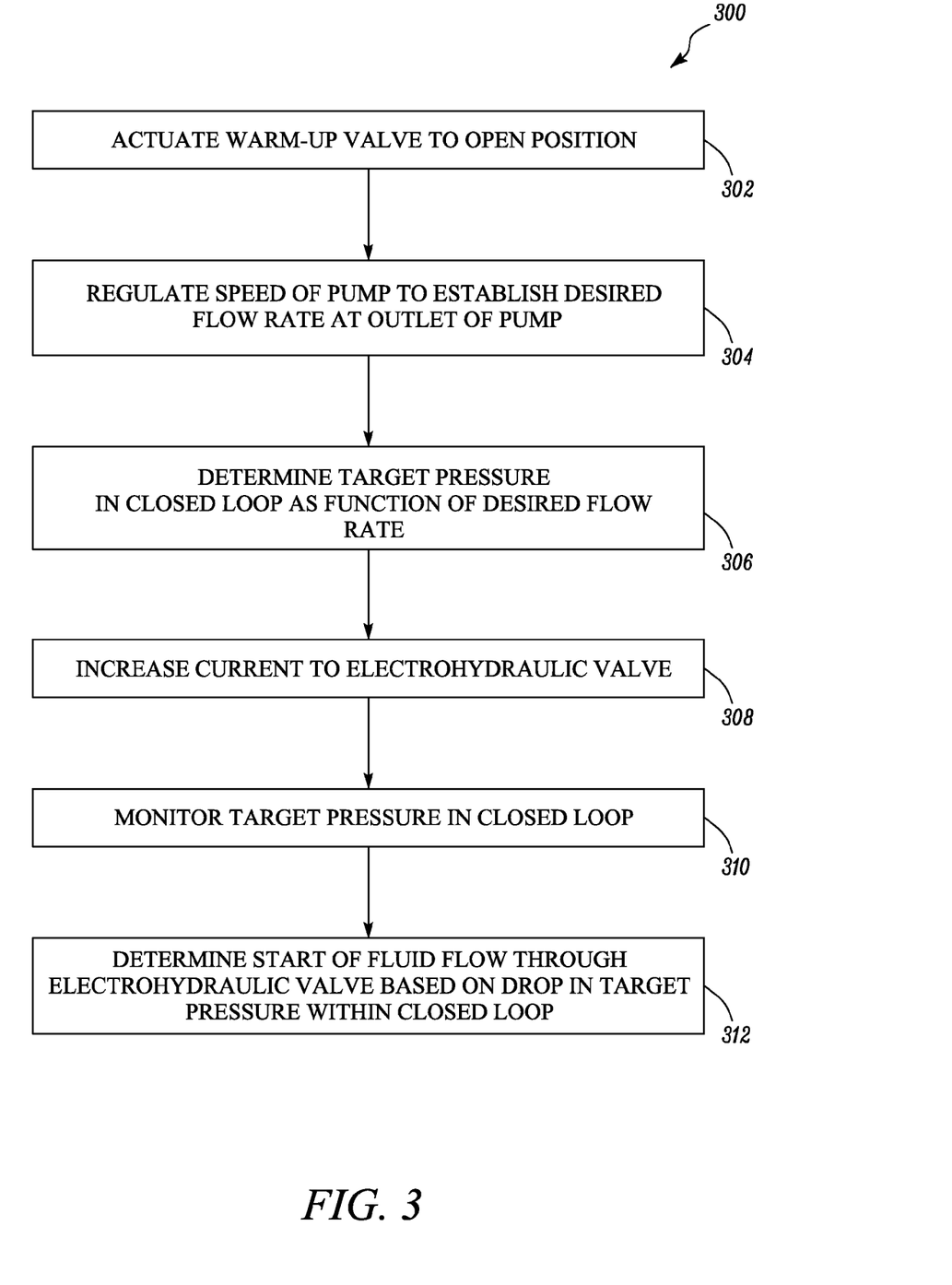
FIG. 3 is a flowchart illustrating a calibration method for an electrohydraulic valve, according to an embodiment of the present disclosure.

FIG. 3 shows a flowchart illustrating a method 300 for calibrating the first electrohydraulic valve 238, according to an embodiment of the present disclosure. At step 302, the controller 296 actuates the on-off valve 268 to the open position. Alternatively or in addition, the controller 296 may actuate the additional on-off valve 270 to supplement the function of the on-off valve 268. In an embodiment, for calibrating any of the electrohydraulic valves 238, 240, 244, 246, 274, 276, 278, 280, either both the on-off valves 268, 270 may be actuated or one of the on-off valves 268, 270 may be actuated. The method 300 also includes pumping fluid at a known flow rate through the on-off valve 268 in order to arrive at a known pressure corresponding to the known flow rate. In an embodiment of the present disclosure, pressure/flow rate characteristics of the on-off valve 268 may already be known or may be determined from a curve, a map or other database. Therefore, the pump 204 may be operated at a speed known to produce a flow rate through the on-off valve 268 that will result in the desired target pressure for calibration of an electrohydraulic valve.

At step 304, the controller 296 actuates the motor 230 to regulate a speed of the fixed displacement pump 204 to achieve a desired flow rate at an outlet of the pump 204. The pump 204 is in fluid communication with the on-off valve 268 and the first electrohydraulic valve 238 within a closed loop circuit. The closed loop circuit is defined between the pump 204, the on-off valve 268 and the first electrohydraulic valve 238. The speed of the pump 204 is varied by varying the speed of the motor 230 to establish a desired flow rate of the fluid. The on-off valve 268 may provide a set flow restriction to a fluid flow therethrough in the open position. Further, since the fluid from the pump 204 may flow through the on-off valve 268 at a known pressure at a known flow rate, the on-off valve 268 may be used to control the pressure in the closed loop circuit. The controller 296 may therefore vary the speed of the motor 230 based on a closed loop pressure control and achieve the desired flow rate of the fluid. At step 306, the method 300 includes determining a target pressure in the closed loop circuit as a function of the desired flow rate of the fluid. Therefore, the target pressure within the closed loop circuit may be achieved by establishing the desired flow rate of the fluid supplied by the pump 204.

At step 308, the method 300 includes increasing a current to the first electrohydraulic valve 238. Prior to increasing the current to the first electrohydraulic valve 238, the controller 296 may actuate the second electrohydraulic valve 240 to the open position. The current supplied to the second electrohydraulic valve 240 may be maintained in a range in order to fully displace the valve element of the main valve of the second electrohydraulic valve 240 to the open position. Thereafter, the controller 296 increases a current supply to the electric actuator of the pilot valve corresponding to the first electrohydraulic valve 238.

At step 310, the method 300 includes monitoring the target pressure in the closed loop circuit. The main pressure sensor 286 disposed in the main pressure line 250 may continuously sense the pressure of the fluid flow from the pump 204. The pressure may also be sensed at the outlet of the pump 204 or at any point of the closed loop circuit. The target pressure may be monitored through the operator interface of the controller 296.

At step 312, the method 300 includes determining a start of a fluid flow through the first electrohydraulic valve 238 based on a first drop in the target pressure within the closed loop circuit. At a particular value of the current, the valve element within the main valve of the first electrohydraulic valve 238 starts to displace from the closed position thereof. The displacement of the valve element may allow the pressurized fluid to pass through the first electrohydraulic valve 238, which create the first drop in the pressure of the fluid. Therefore, the first drop in the pressure of the fluid in the closed loop circuit may be indicative of a start of a fluid flow through the first electrohydraulic valve 238. As the second electrohydraulic valve 240 is in the open position, the fluid from the first electrohydraulic valve 238 may flow to the tank 232 instead of the first chamber 226 of the actuator 206. Hence, the calibration process may not operate the actuator 206. The method 300 further includes determining a cracking current based on the value of the current at which the first drop in the target pressure is observed within the closed loop circuit. The cracking current may refer to the particular current value that may be supplied to the first electrohydraulic valve 238 to initiate a flow of the fluid therethrough. The cracking current may be offset from the value of the current at which the first drop in the target pressure is observed because of a time lag between electric signals from the controller 296 and the corresponding response within the hydraulic circuit 202.

In an embodiment, the various steps of the method 300, as described above, may be implemented by user inputs via the operator interface. In an alternative embodiment, the controller 296 may automatically execute the various steps of the method 300 according to predetermined instructions accessible by the controller 296. In a further embodiment, one or more steps of the method 300 may be implemented by user inputs while the other steps may be automatically executed.

The present disclosure is also related to a method of calibrating the first electrohydraulic valve 238 and the second electrohydraulic valve 240. The method of calibrating the first electrohydraulic valve 238 is similar to the method 300 described above. The method of calibrating the second electrohydraulic valve 240 includes actuating both the first electrohydraulic valve 238 and the second electrohydraulic valve 240 to the closed positions. The first and the second electrohydraulic valves 238, 240 may be closed after the calibration of the first electrohydraulic valve 238. The controller 296 may actuate both the electrohydraulic valves 238, 240 valves to the closed positions. At the same time, the on-off valve 268 is kept at the open position. Optionally, the additional on-off valve 270 may also be kept in the open position.

In an embodiment of the method, the rotating speed of the fixed displacement pump 204 may be regulated again to establish the desired flow rate of the fluid in the hydraulic circuit 202 corresponding to the target pressure. However, in an alternative embodiment, the pump 204 may not further run and the pressure in the closed loop circuit, after the first drop, may be monitored. The closed loop circuit may be formed by the first and second electrohydraulic valves 238, 240, the pump 204 and the on-off valve 268.

The method further includes actuating the first electrohydraulic valve 238 to the open position. The current supplied to the first electrohydraulic valve 238 is maintained in a range in order to fully displace the valve element of the main valve to the open position.

The method further includes increasing a current to the second electrohydraulic valve 240. The method further includes monitoring the pressure in the closed loop circuit. The method further includes determining a start of a fluid flow through the second electrohydraulic valve 240 based on a second drop in the pressure within the closed loop circuit. At a particular value of the current that communicated to the second electrohydraulic valve 240, the valve element within the main valve of the second electrohydraulic valve 240 starts to displace from the closed position thereof. The displacement of the valve element may allow the pressurized fluid to pass through the second electrohydraulic valve 240, which results in the second drop in the pressure within the closed loop circuit. The method further includes determining a cracking current based on the value of the current at which the second drop in pressure is observed within the closed loop circuit.

In another embodiment of FIG. 2, calibration of the second PC valve 246 may be done with respect to the second CT valve 244 similar to the calibration method 300 adapted for the first electrohydraulic valve 238. For calibrating the second PC valve 246, the other PC valves 238, 274, 278 may be closed and the other CT valves 240, 276, 280 may be closed. Optionally, the speed of the pump 204 may be regulated to establish the target pressure based on the desired fluid flow rate for each calibration process. The second PC valve 246 then may be calibrated similar the method 300. The third PC valve 274 and the fourth PC valve 278 may be calibrated similar to the calibration of the first PC valve 238 described above. Similarly, the third CT valve 276 and the fourth CT valve 280 may be calibrated similar to the calibration of the first CT valve 240, as described above. In an embodiment, the on-off valve 268 may be opened while calibrating the valves 238, 240, 244 and 246, while the additional on-off valve 270 may be opened while calibrating the valves 274, 276, 278 and 280.

INDUSTRIAL APPLICABILITY

A hydraulic system includes one or more electrohydraulic valves. Electrohydraulic valves may involve various design and manufacturing complexities. Various components of the electrohydraulic valve may experience wear due to prolonged use. Hence, calibration of the electrohydraulic valve may be required to ensure that the electrohydraulic valves meet desired performance requirements.

The present disclosure is related to the hydraulic system 200 and the method 300 for calibrating one or more of the valves 238, 240, 244, 246, 274, 276, 278 and 280. The on-off valve 268 and the additional on-off valve 270 of the hydraulic circuit 202 may both provide a set flow restriction to a fluid flow therethrough in the open position. Therefore, the on-off valve 268 and the additional on-off valve 270 may be opened to control the pressure within the hydraulic circuit 202 during the calibration process. Further, the target pressure within the hydraulic circuit 202 may be conveniently achieved by establishing the desired flow rate of the fluid supplied by the pump 204. Therefore, the calibration may be achieved without the need for any additional valves, for example, bypass valves. The calibration process may also be simplified as the on-off valve 268 and the additional on-off valve 270 are either in the fully open or the fully closed position, and may not require any regulation of a variable opening.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of calibrating an electrohydraulic valve, the method comprising:
   actuating an on-off valve to an open position,
      wherein the on-off valve is initially in a closed position, and
      wherein the on-off valve is configured to provide a set flow restriction to a fluid flow therethrough in the open position, with flow through the on-off valve having a known pressure at a known flow rate;
   regulating a speed of a fixed displacement pump to establish a desired flow rate at an outlet of the fixed displacement pump,
      wherein the fixed displacement pump is in fluid communication within a closed loop circuit with the on-off valve and the electrohydraulic valve;
   determining a target pressure in the closed loop circuit as a function of the desired flow rate;
   increasing a current to the electrohydraulic valve;
   monitoring the target pressure in the closed loop circuit; and
   determining a start of a fluid flow through the electrohydraulic valve based on a drop in the target pressure within the closed loop circuit.

2. The method of claim 1, wherein the on-off valve is a two-port two-way valve.

3. The method of claim 1, wherein regulating the speed of the fixed displacement pump comprises varying a speed of a motor operatively coupled with the fixed displacement pump.

4. The method of claim 1, further comprising determining a cracking current of the electrohydraulic valve based on a value of the current provided to the electrohydraulic valve coinciding with the drop in the target pressure within the closed loop circuit.

5. The method of claim 1, further comprising actuating an additional electrohydraulic valve to an open position, wherein the additional electrohydraulic valve is in fluid communication with a tank.

6. A method of calibrating a first electrohydraulic valve configured to control fluid flow from a pump to a cylinder and a second electrohydraulic valve configured to control fluid flow from the cylinder to a tank, the method comprising:
   opening an on-off valve in a closed loop circuit that includes the first electrohydraulic valve and the pump,
      wherein the on-off valve is initially in a closed position, and
      wherein the on-off valve is configured to provide set flow restrictions to fluid flow therethrough in the open position, with flow through the on-off valve having a known pressure at a known flow rate;
   actuating the second electrohydraulic valve to an open position;
   regulating a speed of the pump to establish a desired flow rate at an outlet of the pump,
      wherein the desired flow rate from the pump results in a target pressure in the closed loop circuit;
   increasing a current to the first electrohydraulic valve;
   monitoring the target pressure in the closed loop circuit;
   determining a start of a fluid flow through the first electrohydraulic valve based on a first drop in the target pressure in the closed loop circuit;
   actuating the first electrohydraulic valve and the second electrohydraulic valve to closed positions while maintaining the on-off valve in an open position;
   actuating the first electrohydraulic valve to an open position;
   increasing a current to the second electrohydraulic valve;
   monitoring pressure of the fluid flow in the closed loop circuit; and
   determining a start of a fluid flow through the second electrohydraulic valve based on a second drop in the pressure of the fluid flow in the closed loop circuit.

7. The method of claim 6, wherein the on-off valve is a two-port two-way valve.

8. The method of claim 6, wherein regulating the speed of the pump comprises varying a speed of a motor operatively coupled with the pump.

9. The method of claim 6, further comprising determining a cracking current of the first electrohydraulic valve based on a value of the current provided to the first electrohydraulic valve coinciding with the first drop in the target pressure in the closed loop circuit.

10. The method of claim 6, further comprising determining a cracking current of the second electrohydraulic valve based on a value of the current provided to the second electrohydraulic valve coinciding with the second drop in the pressure of the fluid flow in the closed loop circuit.

11. A system for calibrating an electrohydraulic valve, the system comprising:
a pump configured to pressurize a fluid,
   wherein the pump is in fluid communication with the electrohydraulic valve;
an on-off valve disposed in fluid communication with the pump,
   wherein the on-off valve is initially in a closed position, and
   wherein the on-off valve is configured to provide a flow restriction to a fluid flow therethrough in the open position, with flow through the on-off valve having a known pressure at a known flow rate; and
a controller communicably coupled to the electrohydraulic valve, the pump, and the on-off valve,
the controller configured to:
   actuate the on-off valve to an open position;
   regulate speed of the pump to establish a desired flow rate at the outlet of the pump,
      the desired flow rate from the pump resulting in a target pressure as a result of passage through the on-off valve;
   increase a current to the electrohydraulic valve;
   monitor the target pressure; and
   determine a start of a fluid flow through the electrohydraulic valve based on a drop in the target pressure.

12. The system of claim 11, wherein the electrohydraulic valve is electrically actuated by the controller.

13. The system of claim 11, wherein the on-off valve is a solenoid valve.

14. The system of claim 11, wherein the pump comprises a variable speed motor configured to be regulated by the controller.

15. The system of claim 11, wherein the controller is further configured to determine a cracking current of the electrohydraulic valve based on a value of the current provided to the electrohydraulic valve coinciding with the drop in the target pressure.

16. The system of claim 11, further comprising an additional electrohydraulic valve in fluid communication with a tank.

17. The system of claim 16, wherein the controller is further configured to actuate the additional electrohydraulic valve to an open position.

18. The system of claim 16, wherein the controller is further configured to:
   actuate the electrohydraulic valve and the additional electrohydraulic valve to closed positions;
   actuate the electrohydraulic valve to an open position;
   increasing a current to the additional electrohydraulic valve; and
   determine a start of a fluid flow through the additional electrohydraulic valve based on a drop in the pressure of the fluid flow.

19. The system of claim 16, further comprising an actuator,
   wherein the actuator comprises a chamber in fluid communication with the electrohydraulic valve and the additional electrohydraulic valve.

20. The system of claim 19, wherein the actuator is a hydraulic cylinder.

* * * * *